Patented Feb. 27, 1923.

1,446,874

UNITED STATES PATENT OFFICE.

BENJAMIN T. BROOKS, OF BAYSIDE, NEW YORK, ASSIGNOR TO CHADELOID CHEMICAL COMPANY, A CORPORATION OF WEST VIRGINIA.

PROCESS OF DEHYDRATING CHLORHYDRINS.

No Drawing.   Application filed August 4, 1919.   Serial No. 315,078.

*To all whom it may concern:*

Be it known that I, BENJAMIN T. BROOKS, a citizen of the United States, and a resident of Bayside, in the county of Queens, Long Island, and State of New York, have invented certain new and useful Improvements in Processes of Dehydrating Chlorhydrins, of which the following is a specification.

The present invention relates to the manufacture of the simpler chlorhydrins in a substantially anhydrous form. More particularly it relates to the preparation of substantially anhydrous ethylene and propylene chlorhydrins, or mixtures of these chlorhydrins. The chlorhydrins of the other homologues of ethylene are sparingly soluble in water and their dehydration offers no particular difficulty. However in many chemical syntheses it is desirable to employ ethylene and propylene chlorhydrins in a very concentrated or anhydrous form and in this form they are also valuable as solvents, for example, for natural and synthetic resins, including particularly the copals, for fatty oils, as a solvent or diluent in varnishes and the like, cellulose ester solutions and lacquer mixtures. But these simpler chlorhydrims, whose solvent power, boiling point, non-toxicity and low inflammability make them valuable as industrial solvents, are very soluble in water and vice versa. I find that dilute aqueous solutions of these chlorhydrins are practically valueless as solvents and that even five to ten per cent of water very seriously impairs their efficiency as solvents. For example eight per cent of water in ethylene or propylene chlorhydrin will only partly dissolve the copals and gives turbid solutions, or rather partial solutions.

As is well known, the action of hypochlorous acid on ethylene and propylene results in the formation of the corresponding chlorhydrins, but chlorhydrins produced in this way are obtained in dilute aqueous solutions. The physical behavior of ethylene and propylene chlorhydrins, and mixtures of them, is characteristic and shows certain heretofore unknown and undefined properties. The isolation of these chlorhydrins in substantially anhydrous form by a practical and economical method is the result accomplished by the method herein described.

Ethylene chlorhydrin is completely miscible in water and its boiling point at atmospheric pressure is 128° C. However it cannot be separated from water by the usual process of fractional distillation as it forms a constant boiling mixture, with about sixty per cent by weight of water, which boils at about 97.5° C. Therefore ethylene chlorhydrin is not found in the last fractions when its dilute aqueous solutions are distilled but is most concentrated in the first fractions. I have been able in this way to concentrate a five per cent solution of ethylene chlorhydrin to a twenty per cent solution. However the chlorhydrin continues to pass over until about eighty per cent of the original aqueous solution has been distilled. The separation of ethylene chlorhydrin and water, or the concentration of the chlorhydrin in the first fractions is very markedly improved if the original aqueous solution is treated with a relatively large amount of a soluble salt, not reactive to the chlorhydrin, such as sodium chloride, calcium chloride, sodium sulphate, magnesium sulphate, magnesium chloride and the like.

The distillation behavior of such strongly saline solutions of chlorhydrin as compared with a nonsaline solution is shown by the following records. One liter of an aqueous solution containing twenty-four per cent by weight of ethylene chlorhydrin gave, by distillation, an initial fraction containing 37.5 per cent of chlorhydrin: when 75 per cent of the original solution had been distilled, a small fraction collected at that point contained 7.6 per cent of chlorhydrin and a similar fraction, collected when 85 per cent of the original solution had passed over, still contained 2.0 per cent of chlorhydrin. However, on adding 10 per cent of anhydrous calcium chloride to a liter of ethylene chlorhydrin solution of the same concentration as before, all of the chlorhydrin had distilled when only 47 per cent of the volume of the original saline solution had distilled. In a similar manner two liters of an aqueous solution containing 24.0 per cent of propylene chlorhydrin was distilled and a small fraction collected when 75 per cent of the original volume had been distilled showed a chlorhydrin content of 1.0 per cent. On the other hand on saturating a portion of the 24.0 per cent solution of propylene chlorhydrin with common salt and distilling, all of the chlorhydrin had distilled over by the time 42.5 per cent of the original volume of solution had distilled over. Two liters of a solution containing 29 per cent by weight of a mixture of approximately equal parts of ethylene and propylene chlorhydrin behaved in a precisely similar manner.

Propylene chlorhydrin and water form a constant boiling mixture containing about 46.0 per cent of the chlorhydrin. A mixture of about equal parts of ethylene and propylene chlorhydrins appears to form a constant boiling mixture containing about 51 per cent by weight of the chlorhydrins, that is to say the results of the distillation of such mixtures when plotted in the usual manner show a straight line corresponding to this composition for a considerable interval. The value of neutral salts in concentrating the very soluble chlorhydrins by distillation is therefore very marked.

Concentration of ethylene and propylene chlorhydrins can sometimes be accomplished by saturating their aqueous solutions with a neutral salt and separating the two liquid layers thus formed. For example, an aqueous solution, 1800 grams containing 42.0 per cent of ethylene chlorhydrin on saturating with common salt separated into two layers, the upper oily layer, 680 grams, containing 72 per cent ethylene chlorhydrin.

It will be noted that in this manner chlorhydrin-water mixtures are obtained which contain much more chlorhydrin than the ordinary constant boiling mixture. When these mixtures are distilled the constant boiling mixture distills first until practically all of the water has distilled and finally a large proportion of anhydrous chlorhydrin is obtained. It will be noted that by means of these methods as described above, distilling and salting out, a very dilute chlorhydrin solution may be converted to the anhydrous condition without making use of a solvent or drying by chemical means.

The most rapid and economical method of obtaining ethylene and propylene chlorhydrins, or their mixtures, in an anhydrous condition makes use of the two steps described above, together with a third operation. This last improvement consists in treating the concentrated oily solutions, which are salted out by saturating with neutral salts, with a solvent which is substantially insoluble in water. For example, an ethylene chlorhydrin solution containing about 30 per cent of water separates into two layers when treated with benzene or carbon tetrachloride. These two layers consist of a solvent-chlorhydrin phase and a water-chlorhydrin phase, the chlorhydrin being distributed between the water and solvent in accordance with the principle of partition coefficients. It may sometimes be desired to use the chlorhydrins in solution in the solvent, as obtained in the above manner, but when it is desired in a pure and anhydrous condition the solvent and chlorhydrin may be separated by fractional distillation. For this reason I prefer to employ solvents whose boiling points are either considerably lower or higher than those of the chlorhydrins. I have found that light gasoline or petroleum ether, benzene, chloroform, carbon bisulphide and carbon tetrachloride are particularly adapted for this purpose. The solvents having boiling points below those of ethylene and propylene chlorhydrins are preferable to the solvents having higher boiling points, kerosene or turpentine for example, since when the former are employed the chlorhydrins are obtained in a very pure anhydrous condition by merely distilling, and thus recovering the solvent. The last traces of water may be removed prior to distillation of the solvent by means of a water binding substance such as anhydrous sodium sulphate, anhydrous copper sulphate, calcium chloride and the like, but for ordinary solvent purposes this is not necessary.

I have found the following method, which I prefer, to be most economical and expedient. A 5 per cent aqueous solution containing ethylene and propylene chlorhydrins, is distilled through an efficient fractionating column until about 40 per cent of the solution has been distilled. The distillate is saturated with common salt and distilled again and the second distillate thus obtained is saturated with common salt. The aqueous saline solution is separated from the oily chlorhydrin layer and returned to the still for re-concentration. The oily chlorhydrin layer is treated with an equal volume of benzene and the aqueous layer thus formed is separated and also returned to the still. The benzene solution is distilled thus recovering the benzene and the fraction boiling from 126° to 134° is collected as anhydrous chlorhydrins. As thus prepared the chlorhydrins are excellent solvents for copals and cellulose esters and may be incorporated in other solvent mixtures in which aqueous-chlorhydrin mixutres could not be used.

What I claim is:—

1. The process of producing ethylene and propylene chlorhydrins of high concentration, which comprises adding to their aqueous solutions, a water-soluble, non-alkaline salt, separating the concentrated portion from the more dilute portion and treating the portion which is richer in chlorydrins with a solvent which is substantially insoluble in water.

2. The process of producing ethylene and propylene chlorhydrins of high concentration, which comprises adding to their aqueous solutions, a water-soluble, non-alkaline salt, separating the concentrated portion from the more dilute portion, treating the portion which is richer in chlorhydrins with a solvent which is substantially insoluble in water and separating the chlorhydrins and solvent by distillation.

3. The process of producing substantially anhydrous liquid chlorhydrins which comprises adding salt to an aqueous solution thereof, separating the concentrated portion from the more dilute portion and treating the concentrate with a solvent which is immiscible with water thereby separating the chlorhydrins from the water.

BENJAMIN T. BROOKS.